US010261942B2

(12) United States Patent
Mackay et al.

(10) Patent No.: US 10,261,942 B2
(45) Date of Patent: Apr. 16, 2019

(54) EMBEDDED PROCESSING OF STRUCTURED AND UNSTRUCTURED DATA USING A SINGLE APPLICATION PROTOCOL INTERFACE (API)

(71) Applicant: LONGSAND LIMITED, Cambridge (GB)

(72) Inventors: Lewis Mackay, Cambridge (GB); Darren Gallagher, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 19 days.

(21) Appl. No.: 15/303,602

(22) PCT Filed: May 1, 2014

(86) PCT No.: PCT/EP2014/058956
§ 371 (c)(1),
(2) Date: Oct. 12, 2016

(87) PCT Pub. No.: WO2015/165545
PCT Pub. Date: Nov. 5, 2015

(65) Prior Publication Data
US 2017/0031929 A1    Feb. 2, 2017

(51) Int. Cl.
*G06F 16/11* (2019.01)
*G06F 16/14* (2019.01)
*G06F 16/13* (2019.01)
*G06F 9/54* (2006.01)
*G06F 17/30* (2006.01)

(52) U.S. Cl.
CPC .............. *G06F 16/116* (2019.01); *G06F 9/54* (2013.01); *G06F 16/13* (2019.01); *G06F 16/148* (2019.01);
(Continued)

(58) Field of Classification Search
None
See application file for complete search history.

(56) References Cited

U.S. PATENT DOCUMENTS 7,668,849 B1 *   2/2010   Narancic
7,774,301 B2     8/2010   Johnson et al.
(Continued)

FOREIGN PATENT DOCUMENTS

CN    101452487    6/2009

OTHER PUBLICATIONS

Alamb, "Vertica Analytics Anywhere", http://www.vertica.com/?s=Flexstore, (Web Page), Hewlett Packard Enterprise, Retreived on Oct. 11, 2016, 9 pages.
(Continued)

*Primary Examiner* — Syed A Roni

(57) ABSTRACT

Example embodiments relate to embedded processing of structured and unstructured data. Example embodiments may traverse a directory structure of the computing device, wherein a storage medium of the computing device comprises structured data and non-structured data. For a first file traversed in the directory structure, a first file format of the first file may be detected, the first file format comprising an unstructured file type. The content and metadata of the first file may be obtained and included in a directory table stored in the storage medium. For a second file traversed in the directory structure, a second file format of the second file may be detected, the second file format comprising a structured file type. The content and metadata of the second file may be obtained and included in the directory table stored in the storage medium.

14 Claims, 7 Drawing Sheets

(52) U.S. Cl.
CPC .. *G06F 17/30076* (2013.01); *G06F 17/30091* (2013.01); *G06F 17/30106* (2013.01); *G06F 17/30318* (2013.01); *G06F 17/30563* (2013.01); *G06F 17/30569* (2013.01)

(56) References Cited

U.S. PATENT DOCUMENTS

| | | | |
|---|---|---|---|
| 7,849,049 B2 | 12/2010 | Langseth et al. | |
| 2006/0095830 A1 | 5/2006 | Krishna et al. | |
| 2007/0011134 A1* | 1/2007 | Langseth | G06F 17/30563 |
| 2012/0117120 A1 | 5/2012 | Jacobson | |
| 2013/0204991 A1 | 8/2013 | Skjolsvold et al. | |
| 2014/0006369 A1 | 1/2014 | Blanchflower | |

OTHER PUBLICATIONS

Cembalo, A. et al., "An Approach to Document Warehousing System Lifecycle From Textual ETL to Mulitdimensional Queries", 2012 Sixth International Conference on Complex Intelligent and Software Intensive Systems IEEE Computer Society 2012 8 pages.

International Searching Authority, "Notification of Transmittal of the International Search Report and the Written Opinion", PCT/EP2014/058956, dated Jan. 20, 2015 16 pages.

Mansuri, I. et al., "Integrating Unstructured Data into Relational Databases", Proceeding of the 22nd International Conference on Data Engineering, IEEE Computer Society 2006 12 pages.

Sears, R. et al., "To Blob or Not to Blob: Large Object Storage in a Database or a Filesystem", Microsoft Research, Technical report MSR-TR-2006-45, Jun. 2006, 12 pages.

Sullivan, D., "Document Warehousing and Text Mining", Wiley Computer Publishing, 2001, 72 pages.

Unknown, "Platform for Big Data", Data Science, http://datasciencegroup.blogspot.in/2014/01/pig.html, (Web Page), Jan. 7, 2014, 6 pages.

Unknown, "Uploading Binary files to mySQL", Dreamwerx.Net—Innovation HQ!, Sep. 8, 2002, 4 pages.

\* cited by examiner

US 10,261,942 B2

EMBEDDED PROCESSING OF STRUCTURED AND UNSTRUCTURED DATA USING A SINGLE APPLICATION PROTOCOL INTERFACE (API)

BACKGROUND

Increasing amounts of data are processed and transferred across the Internet. Analyzing this data can be complex and time-consuming, given the massive amount of data and the various types of data to be analyzed. The complexity of the analysis may be further increased due to issues with storage of data from numerous sources. For example, the various types of data from these numerous sources may need to be translated to a homogenous type before being stored in an individual data storage system for analysis.

BRIEF DESCRIPTION OF THE DRAWINGS

The following detailed description references the drawings, wherein.

DETAILED DESCRIPTION

Figure 1:
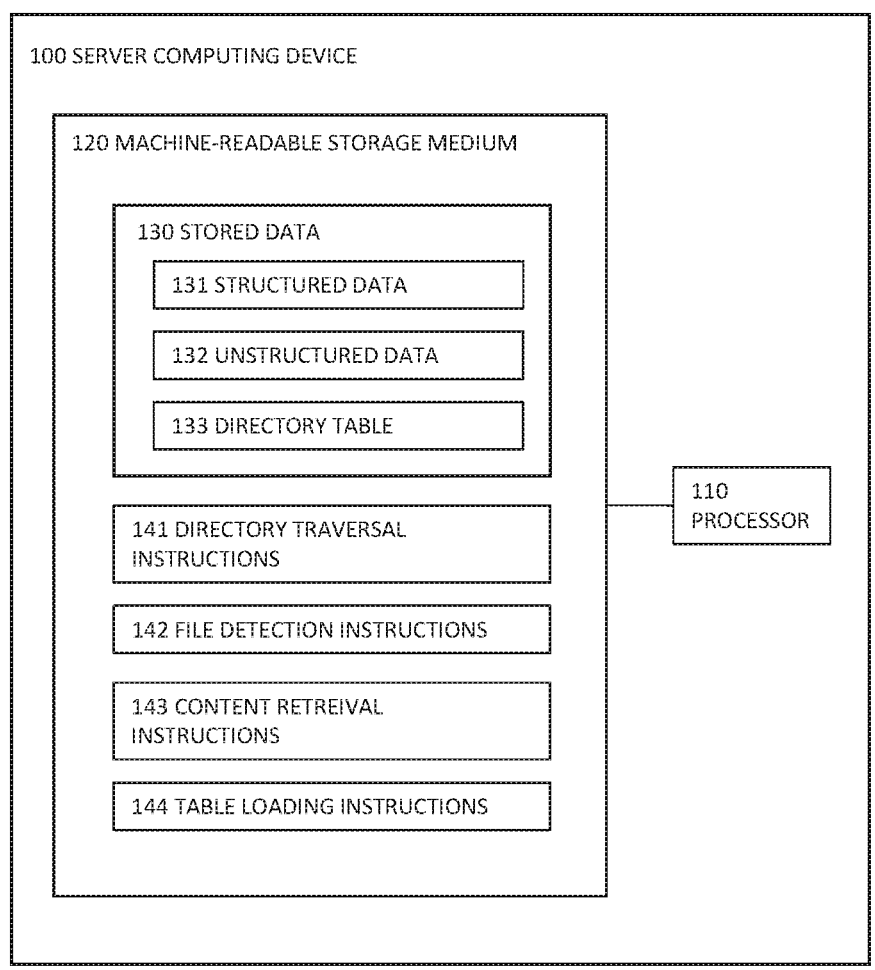
FIG. 1 is a block diagram of an example server computing device for embedded processing of structured and unstructured data.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, analyzing the increasing amount and types of data that are processed by users can be complex and time-consuming. The data being analyzed may be stored natively at a database or obtained from federated data sources separate from a database. A federated data source may comprise, for example, an autonomous data source communicably coupled to a data source, via which the data source may access and analyze data. Example database management tools may access data from federated sources, translate the data from the federated data sources into formats used by the database, and store the translated data in the database. Accordingly, the data natively stored in the database and the data obtained from federated sources may have a uniform format when stored and accessed in the database. The translation of the data from various sources may require complex processing and may involve additional computing resources between the database and the federated sources to translate the data from the federated data sources.

Example embodiments disclosed herein address these issues by enabling a database server to obtain data from federated sources and store the obtained data without translation. For example, the database server may obtain the data in a first format from a federated source and store that data in the first format in the database server without changing the data prior to storage in the database server. The database server may update its directory structure to include the obtained data.

As such, the data stored in the database may include native data and/or data from various federated sources. The data stored in the database may comprise various types of data, including, for example, structured data, semi-structured data, unstructured data, and/or other types of data.

Structured data may comprise, for example, data that resides in and is delineated by predetermined defined fields, such that a defined field may indicate a type of data stored, restrictions on the data stored, and/or other information related to data stored in the field. Examples of structured data include xml data, data stored in tables, tagged data, and/or other data stored in and delineated by predetermined defined fields. In some examples, all of the data in a structured data file may be stored in and delineated by defined fields.

Unstructured data comprises data that may not be delineated by or stored in defined fields. In some examples, unstructured data may comprise, for example, metadata that may comprise a set of defined fields (e.g., file name, file type, file size, and/or other features of the data) as well as content that is not stored in or delineated by defined fields. Examples of unstructured data include pdf files, images, and/or other data which may not be stored in and delineated by defined fields.

Semi-structured data may comprise data that includes both structured and unstructured data. Semi-structured data may comprise metadata and content where some of the content may be delineated by defined fields. For example, semi-structured data may not have a rigid structure (e.g., like structured data), but instead may comprise some data that is not stored in and delineated by defined fields. Examples of semi-structured data may include emails, word documents, and/or other data that comprise structured data and unstructured data.

The example database server may traverse files in the directory structure and may use a single application protocol interface (APIA to detect the file format of the traversed files. As mentioned above, the files may comprise various file formats, including structured file types, semi-structured file types, unstructured file types, and/or other file types. The API may detect files with a variety of file formats. In some examples, the API may detect a first file of a first format, may cause a first module to obtain content and metadata of the first file, and may cause the metadata and content of the first file to be stored in a directory table stored in the database server. The API may also detect a second file of a second format different from the first format (e.g., where the first file format comprises a structured file type and the second file format comprises an unstructured file type), may cause a second module to obtain content and metadata of the second file, and may cause the metadata and content of the second file to be stored in the directory table.

The server computing device may define a table schema for the directory table in which the metadata and content of the traversed files is to be stored. In some examples, the table schema may be defined based on a search conducted on the directory structure of the server computing device from which the traversed files are accessed. In some examples, the table schema may be defined based on the metadata of the traversed files. For example, the table schema may be defined based on a set of fields from the metadata of the traversed files. The server computing device may populate the metadata and content of the files in the directory table according to the defined table schema. In some examples, the server computing device may re-map the metadata of a traversed file to correspond with the defined table schema.

Referring now to the drawings, FIG. 1 is a block diagram of an example server computing device 100 for embedded processing of structured and unstructured data. Server computing device 100 may be a database server, a mainframe, a database, or any other device suitable for executing the functionality described below. Server computing device 100 may be a computing device accessible to a federated data source, such as federated data source 400A of FIG. 3, over a network such as the Internet. In the embodiment of FIG. 1, server computing device 100 includes a processor 110 and a non-transitory machine-readable storage medium 120.

Processor 110 may be one or more central processing units (CPUs), microprocessors, and/or other hardware devices suitable for retrieval and execution of instructions stored in machine-readable storage medium 120. Processor 110 may reside in server computing device 100 and/or be distributed across multiple computing devices.

Processor 110 may fetch, decode, and execute program instructions 141, 142, 143, 144, and/or other instructions to enable embedded processing of structured and unstructured data on the server computing device 100, as described below. As an alternative or in addition to retrieving and executing instructions, processor 110 may include one or more electronic circuits comprising a number of electronic components for performing the functionality of one or more of program instructions 141, 142, 143, 144, and/or other instructions.

In one example, the program instructions can be part of an installation package that can be executed by processor 120 to implement the functionality described herein. In this case, memory 120 may be a portable medium such as a CD, DVD, or flash drive or a memory maintained by another computing device from which the installation package can be downloaded and installed. In another example, the program instructions may be part of an application or applications already installed on server computing device 100.

Machine-readable storage medium 120 may be any hardware storage device for maintaining data accessible to server computing device 100. For example, machine-readable storage medium 120 may include one or more hard disk drives, solid state drives, tape drives, and/or any other storage devices. The storage devices may be located in server computing device 100 and/or in another device in communication with server computing device 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As detailed below, storage medium 120 may maintain and/or store the data and information described herein.

As described in detail below, machine-readable storage medium 120 may store data including, for example, structured data 131, semi-structured data, unstructured data 132, and/or other types of data. Machine-readable storage medium 120 may store the structured data, semi-structured data, unstructured data, and/or other types of data in a set of directories. The structured data, semi-structured data, unstructured date, and/or other types of data may include data native to the server computing device 100 as well as data obtained from federated sources. In some examples, the native data may comprise all structured data, whereas the obtained data may comprise various types of data. Machine-readable storage medium 120 may also store a directory table 133 in which data may be stored for analysis, processing, and/or other interaction.

Machine-readable storage medium 120 may also be encoded with executable instructions for enabling server execution of the functionality described herein. For example, machine-readable storage medium 120 may store directory traversal instructions 141, file detection instructions 142, content retrieval instructions 143, table loading instructions 144, and/or other instructions that may be used to carry out the functionality of the invention.

Directory traversal instructions 141, when executed by processor 110, may traverse a directory structure of the machine-readable storage medium 120. In some examples, the directory traversal instructions 141, when executed by processor 110, may traverse the directory responsive to receiving a search query for information in the machine-readable storage medium 120.

The directory traversal instructions 141, when executed by processor 110, may return a set of files responsive to traversing the directory structure. In some examples, the directory traversal instructions 141, when executed by processor 110, may return the set of files such that the set of files comprises files of more than one type. Types of files may comprise, for examples, files including semi-structured data, files including unstructured data, any combination thereof, and/or other types of files. In some examples, the set of files may comprise all of the files in the directory structure, a subset of files, a subset of files that meet a search query, and/or other set of files of the directory structure.

File detection instructions 142, when executed by processor 110, may detect each file in the set of files returned by the directory traversal instructions 141. For example, for an individual file, the file detection instructions 142, when executed by processor 110, may detect a file format of the individual file.

In some examples, file detection instructions 142, when executed by processor 110, may detect the file format of an individual file by calling an application protocol interface (API) to determine the first file format. The API may determine file formats of multiple files, where a first file may have a first file format and a second file may have a second file format different from the first file format. In some examples, the machine-readable storage medium 120 may store a list of each of the file formats that may be detected by the file detection instructions 142. In some examples, responsive to encountering a file format outside of the stored list, the file detection instructions 142 may search the Internet to determine a file format of a file and may add that determined file format to the list.

As such, the file detection instructions 142, when executed by processor 110, may use the same API to detect the file formats of each of the files in the set of files. For example, the file detection instructions 142, when executed by processor 110, may use the same API to detect the file formats of each of the files in the set of files, regardless of the file format of each of the individual files in the set of files. To that end, the file detection instructions 142, when executed by processor 110, may use the API to detect a first file format of a first file that comprises structured data, may use the API to detect a second file format of a second file that comprises unstructured data, and may use the API to detect a third file format of a third file that comprises semi-structured data.

Content retrieval instructions 143, when executed by processor 110, may obtain content and/or metadata of a file traversed by the directory traversal instructions 141 and detected by the file detection instructions 142. For example, the content retrieval instructions 143, when executed by processor 110, may use the API to obtain the content and/or metadata of a file detected using the API. In some examples, responsive to the file detection instructions 142 detecting a file format of a file, the content retrieval instructions 143, when executed by processor 110, may automatically obtain the metadata and/or content of the file.

In some examples, the content retrieval instructions 143, when executed by processor 110, may obtain a portion of the metadata and/or content of the file based on the file type detected by the file detection instructions 142. For example, the content retrieval instructions 143, when executed by processor 110, may obtain a first set of metadata and/or content of a file responsive to the file having a first file type, and may obtain a second set of metadata and/or content of the file responsive to the file having a second file type.

In some examples, the machine-readable storage medium 120 may comprise a set of associations between files types and data retrieved from the file. For example, the set of associations may comprise an association between a plurality of sets of file types and a respective plurality of data attributes to be retrieved. A set of file types may comprise, for example, an individual file type, a set of file types that share a set of characteristics, and/or other combinations of file types. The set of characteristics may be predetermined, may be based on whether the file types are associated with structured data, unstructured data, semi-structured data, and/or other types of data, and/or may be otherwise determined. The data attributes may comprise, for example, a set of data fields for which data from a file is retrieved. The data fields may include, for example, metadata fields, content fields, and/or other fields. A data field may be marked as related to metadata, content, and/or other data in the file.

In some examples, the content retrieval instructions 143, when executed by processor 110, may obtain the metadata and/or content of the file based on a search query from which the file traversal instructions 141 returned the set of files. For example, the content retrieval instructions 143, when executed by processor 110, may obtain metadata and/or content of a file based on the search query used by the file detection instructions 141 to return the set of files. The content retrieval instructions 143, when executed by processor 110, may determine metadata fields and/or content fields relevant to the search query and may obtain metadata and/or content from the file based on the determined metadata fields and/or content fields.

In some examples, the content retrieval instructions 143, when executed by processor 110, may load a handler related to the detected file type of the file to obtain the metadata and/or content of the file. The handler may be, for example, a second API, another set of instructions, an engine, and/or other combination of hardware and software to handle the file. The machine-readable storage medium 120 may store associations between a set of handlers and a set of file types, such that an individual handler may be used for an individual file type and/or a subset of the file types recognized by server computing device 100.

In some examples, the file detection instructions 142 and/or the content retrieval instructions 143, when executed by processor 110, may use multiple APIs to detect the file formats of the set of files returned by directory traversal instructions 141 and obtain the metadata and/or content of the detected files. For example, in addition to the API that may detect each of the files of the set of files, the file detection and/or the content retrieval instructions 143, when executed by processor 140, may use a specific API tailored towards the individual file format that was detected.

In some examples, the file detection instructions 142, when executed by processor 110, may use the API to detect a general file type (e.g., a file type related to structured data, a file type related to unstructured data, a file type related to semi-structured data, and/or other general file type) of a file. The file detection instructions 142, when executed by processor, may then cause a second API to be called to detect the particular file type related to the general file type. For example, the file detection instructions 142, when executed by processor 110, may detect that a file comprises unstructured data and has an unstructured file type and may cause a second API to be called that detects the specific unstructured file type. In some of these examples, the content retrieval instructions 143, when executed by processor 110, may use a second API related to the particular file type to obtain metadata and/or content of the detected file. In some of these examples, the content retrieval instructions 143, when executed by processor 110, may use the second API regardless of whether the file detection instructions 142 used the second API to detect the particular file format.

In some examples, the API may determine a specific file type of the file, and may cause a second API associated with the specific file type to be called to detect the specific type of file, obtain metadata and/or content from the file, and/or perform other functionality related to the file.

In some examples, the API (and/or any other APIs that may be used by file detection instructions 142 and/or content retrieval instructions 143) may be stored at the machine-readable storage medium 120. In some examples, the instructions stored at the machine-readable storage medium 120 may comprise the API. The API may be delineated by a separate set of instructions at the machine-readable medium, may be part of file detection instructions 142, content retrieval instructions 143, and/or other instructions stored at the machine-readable storage, and/or may be otherwise stored at the machine-readable storage medium 120.

The table loading instructions 144, when executed by processor 110, may include the metadata and/or content obtained by the content retrieval instructions 143 in a directory table stored at the machine-readable storage medium 120. For example, the table loading instructions 144, when executed by processor 110, may define a table schema for the directory table into which the metadata and/or content is stored. The table loading instructions 144, when executed by processor 110, may then populate the directory table with the metadata and/or content from the set of files returned by the directory traversal instructions 141.

The table loading instructions 144, when executed by processor 110, may define a table schema for the directory table based on the metadata and/or content to populate the table. In some examples, the table loading instructions 144, when executed by processor 110, may define the table schema based upon the native data included in the set of files returned by the directory traversal instructions 141. For example, responsive to native data being included in the set of files, the table loading instructions may determine a set of fields for the directory table based on the metadata and defined fields of the native data. The table loading instructions 144, when executed by processor 110, may then populate the directory table by including the native data in the directory table and by mapping (and/or re-mapping) the structured data, unstructured data, semi-structured data, and/ or other types of data in the obtained data of the set of files to the defined fields of the native data.

In another example, the table loading instructions 144, when executed by processor 110, may determine a set of fields for the directory table based on the metadata and/or content of each of the files of the set of files returned by the directory traversal instructions 141. The table loading instructions 144, when executed by processor 110, may then populate the directory table by mapping (and/or re-mapping) the set of files to the determined set of fields.

In another example, the table loading instructions 144, when executed by processor 110, may determine a set of fields for the directory table based upon a search query by which the directory traversal instructions 141 obtained the set of files. The table loading instructions 144, when executed by processor 110, may determine a set of fields based upon a set of parameters of the search query. The table loading instructions 144, when executed by processor 110, may then populate the directory table by mapping (and/or re-mapping) the set of files to the determined set of fields.

The table loading instructions 144, when executed by processor 110, may determine a set of fields for the directory structure in other manners as well, and is not limited to the examples described herein.

When populating the metadata and/or content of the files in the directory table, the table loading instructions 144, when executed by processor 110, may determine whether the metadata and/or content of the file matches the set of fields for each file in the set of files. Responsive to the metadata and/or content of the file matching the set of fields, the table loading instructions 144, when executed by processor 110, may include the metadata and/or content of the file in the directory table. Responsive to the metadata and/or content not matching, the table loading instructions 144, when executed by processor 110, may map (and/or re-map) the metadata and/or content of the file to the set of fields and include the mapped (and/or re-mapped) data in the directory table. In some examples, the table loading instructions 144, when executed by processor 110, may also include, with the included metadata and/or content of an individual file, a source of the file, a file name of the file, an original file type of the file, an indication of whether the file initially comprised structured data, semi-structured data, unstructured data, and/or other types of data, an indication of whether the data was mapped to the set of fields, a search query associated with the individual file, and/or other information related to the file.

Figure 2:
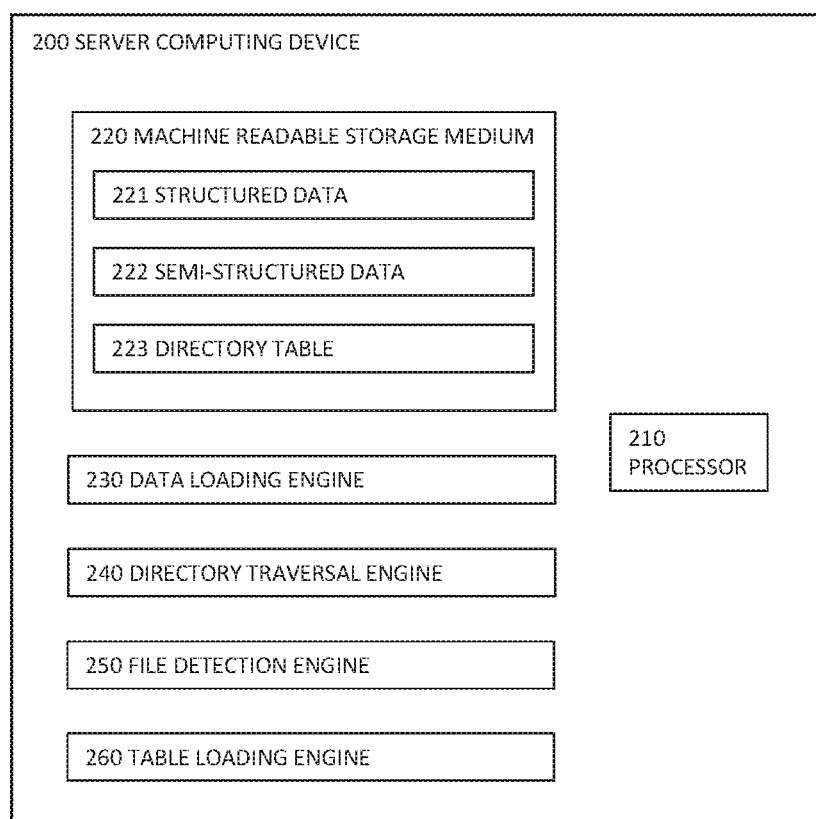
FIG. 2 is a block diagram of an example server computing device for embedded processing of structured and unstructured data.

FIG. 2 is a block diagram of an example server computing device 200 for embedded processing of structured and unstructured data. As with processor 110 of FIG. 1, processor 210 may be one or more CPUs, microprocessors, and/or other hardware devices suitable for retrieval and execution of instructions. As with machine-readable storage medium 120 of FIG. 1, machine-readable storage medium 220 may store structured data 221, unstructured data 222, semi-structured data, a directory table 223, a directory structure, and/or other data.

As illustrated in FIG. 2 and described below, server computing device 250 may communicate with server computing device 200. As with server computing device 100 of FIG. 1, server computing device 200 may be a database server, a mainframe, a database, or any other device suitable for executing the functionality described below.

As detailed below, server 200 may include a series of engines 230-260 for embedded processing of structured and unstructured data. Each of the engines may generally represent any combination of hardware and programming. For example, each of the engines may include a series of program instructions encoded on a machine-readable storage medium and executable by a processor 110 of the server computing device 100. In addition or as an alternative, each engine may include one or more hardware devices including electronic circuitry for implementing the functionality described below.

Data loading engine 230 may load structured data, unstructured data, semi-structured data, and/or other types of data into the directory structure of the machine-readable storage medium 120. In some examples, the data loading engine 230 may load the data received and/or accessed from another computing device without changing the received and/or accessed data prior to storing it in the machine-readable storage medium 120. For example, the data loading engine 330 may store an accessed file with the metadata and content of the file in the format in which the file was stored in the source from which the file was accessed.

Data loading engine 230 may access and/or receive the data from numerous sources (e.g., federated data sources 400A, 400B, . . . , 400N). The sources may comprise, for example, other computing devices in an enterprise in which the server computing device 100 resides, computing devices outside the enterprise, and/or other computing devices which may or may not have a pre-existing relationship with server computing device 100. Multiple types of data (structured, semi-structured, unstructured, and/or other type) may be receive from a single computing device, from multiple computing devices, from each of the computing devices that act as sources, and/or another set of computing devices that act as sources.

In some examples, the data loading engine 330 may update the directory structure of the machine-readable storage medium 120 based on the data loaded from the numerous sources. For example, the data loading engine 330 may update the directory structure to comprise additional fields that relate metadata fields of the loaded data responsive to the directory structure not comprising those additional fields. In another example, the data loading engine 330 may update the directory structure to re-map several fields that relate to the same type of data as a single field.

Directory traversal engine 240 may traverse the directory structure of the server computing device 200. For example, directory traversal engine 240 may traverse the directory structure to access a set of files. Further details regarding an example implementation of directory traversal engine 240 are provided above in connection with directory traversal instructions 141 of FIG. 1.

File detection engine 250 may detect the file formats of the files traversed by the directory traversal engine 240. In some examples, file detection engine 250 may also obtain metadata and content from the detected files. Further details regarding an example implementation of file detection engine 250 are provided above in connection with file detection instructions 142 and/or content retrieval instructions 143 of FIG. 1.

Table loading engine 260 may classify the monitored APIs. Further details regarding an example implementation of table loading engine 260 are provided above in connection with table loading instructions 144 of FIG. 1.

Figure 3:
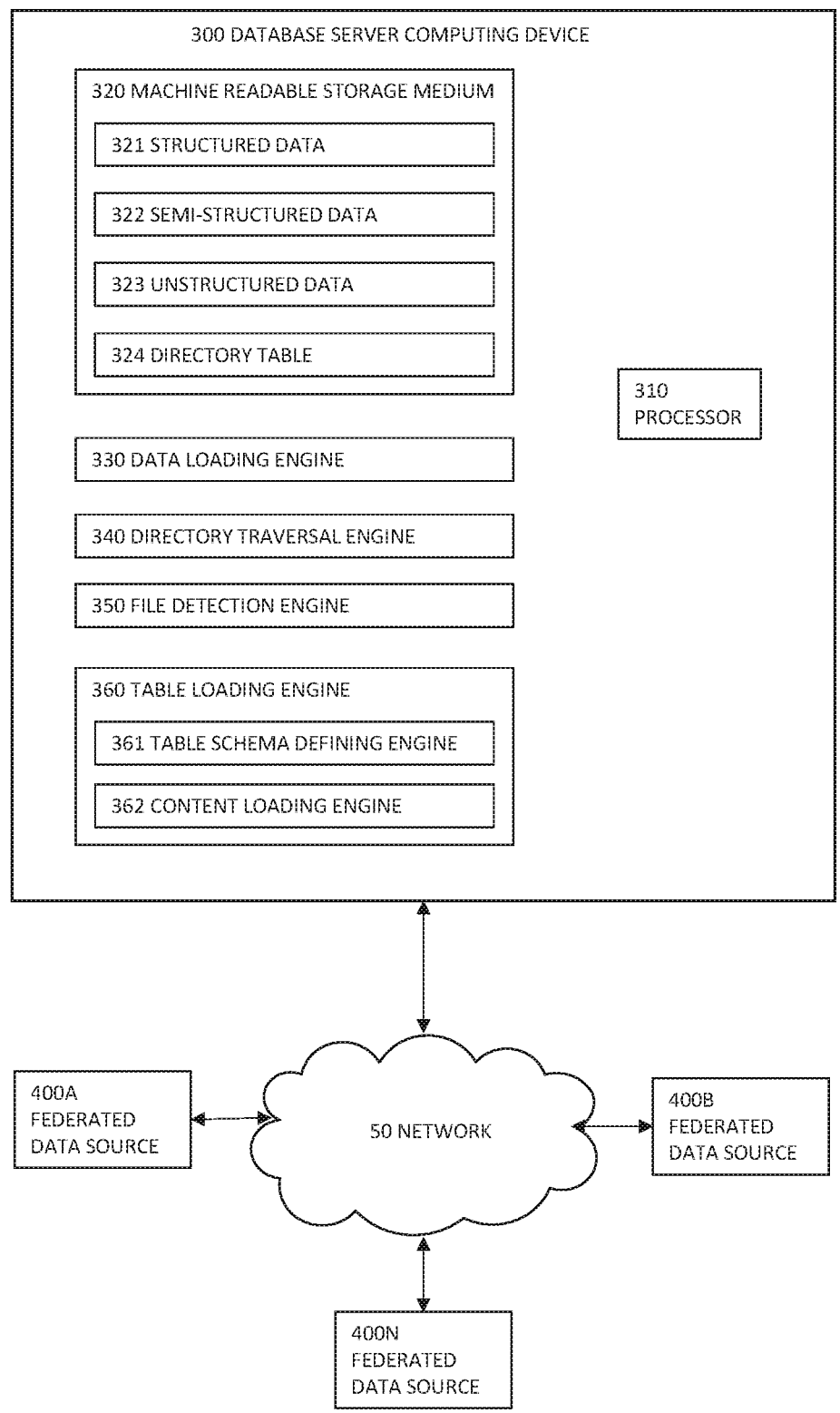
FIG. 3 is a block diagram of an example server computing device for embedded processing of structured and unstructured data in communication with a plurality of server computing devices.

FIG. 3 is a block diagram of an example server computing device 300 in communication with a plurality of federated data sources 400, 400B, ..., 400N for embedded processing of structured and unstructured data. As with server computing device 100 of FIG. 1, server computing device 300 may be a database server, a mainframe, a database, or any other device suitable for executing the functionality described below. As with processor 110 of FIG. 1, processor 310 may be one or more CPUs, microprocessors, and/or other hardware devices suitable for retrieval and execution of instructions. As with machine-readable storage medium 120 of FIG. 1, machine-readable storage medium 320 may store structured data 321, semi-structured data 322, unstructured data 323, a directory table 324, a directory structure, and/or other data.

As detailed below, server 300 may include a series of engines 330-360 for embedded processing of structured and unstructured data. Each of the engines may generally represent any combination of hardware and programming. For example, each of the engines may include a series of program instructions encoded on a machine-readable storage medium and executable by a processor 310 of the server computing device 300. In addition or as an alternative, each engine may include one or more hardware devices including electronic circuitry for implementing the functionality described below.

Data loading engine 330 may load structured data, unstructured data, semi-structured data, and/or other types of data into the directory structure of the machine-readable storage medium 120. Further details regarding an example implementation of data loading engine 330 are provided above in connection with data loading engine 230 of FIG. 2.

Directory traversal engine 340 may traverse the directory structure of the server computing device 200. For example, directory traversal engine 240 may traverse the directory structure to access a set of files. Further details regarding an example implementation of directory traversal engine 340 are provided above in connection with directory traversal instructions 141 of FIG. 1 and/or directory traversal engine 240 of FIG. 2.

File detection engine 350 y detect the file formats of the files traversed by the directory traversal engine 340. Further details regarding an example implementation of file detection engine 350 are provided above in connection with file detection instructions 142 and/or content retrieval instructions 143 of FIG. 1 and/or file detection engine 250 of FIG. 2.

Table loading engine 360 may determine a table schema for a directory table, load metadata and content from the detected files into the directory table, and/or otherwise manage the data from the detected files. Further details regarding an example implementation of table loading engine 360 are provided above in connection with table loading instructions 144 of FIG. 1 and/or table loading engine 260 of FIG. 2.

In some examples, and as depicted in FIG. 3, table loading engine 360 may comprise a set of engines, including, for example, table schema defining engine 361, content loading engine monitoring engine 362, and/or other engines to load data into the tables of the machine-readable storage medium 120.

Table schema defining engine 361 may define a table schema for the directory table. Further details regarding an example implementation of table schema defining engine 361 are provided above in connection with table loading instructions 144 of FIG. 1 and/or table schema defining engine 261 of FIG. 2.

Content loading engine 362 may load content from the traversed files into the directory schema. Further details regarding an example implementation of content loading engine 362 are provided above in connection with table loading instructions 144 of FIG. 1 and/or content loading engine 262 of FIG. 2.

Figure 4:
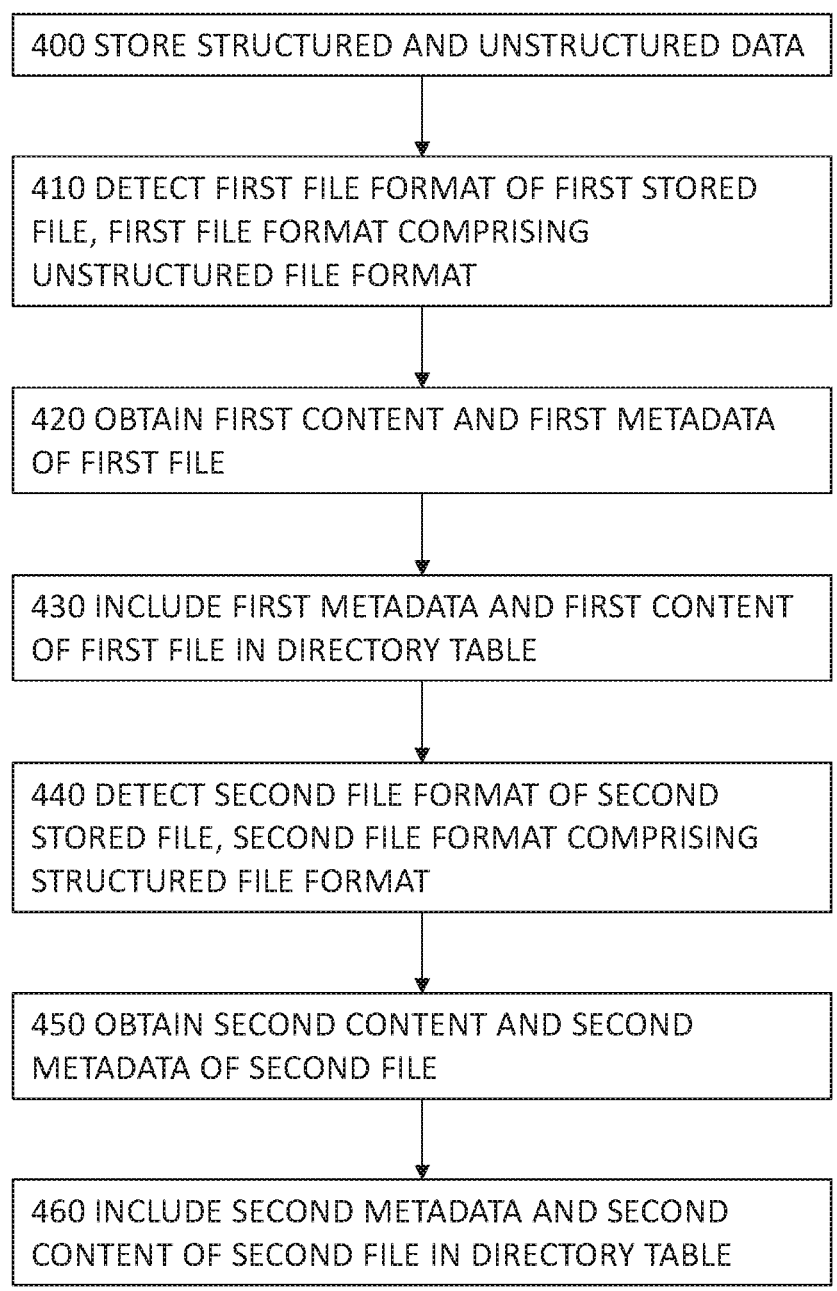
FIG. 4 is a flowchart of an example method for execution by a server computing device for embedded processing of structured and unstructured data.

FIG. 4 is a flowchart of an example method for execution by a server computing device for embedded processing of structured and unstructured data.

Although execution of the method described below is with reference to server computing device 100, other suitable devices for execution of this method will be apparent to those of skill in the art, such as server computing device 200, server computing device 300, and/or other computing devices. The method described in FIG. 4 and other figures may be implemented in the form of executable instructions stored on a machine-readable storage medium, such as storage medium 120, and/or in the form of electronic circuitry.

In an operation 400, structured and unstructured data may be stored in the machine-readable storage medium 120. In some examples, semi-structured data may also be stored in the machine-readable storage medium 120. The data stored in the machine-readable storage medium 120 may be accessed from multiple sources. In some examples, data may be accessed from sources both inside and outside an enterprise management system in which the server computing device 100 may reside. For example, the server computing device 100 (and/or the data loading engine 230, the data loading engine 330, or other resource of the server computing device) may store data in the machine-readable storage medium 120. The server computing device may store the structured and unstructured data in a manner similar or the same as that described above in relation to the execution of the data loading engine 230, the data loading engine 330, or other resource of the server computing device 100.

In an operation 410, a first file format of a first file stored in the machine-readable storage medium 120 may be detected, where the first file format comprises a file format including unstructured data (e.g., an unstructured file format). For example, the server computing device 100 (and/or the file detection instructions 142, the file detection engine 240, the file detection engine 340, or other resource of the server computing device 100) may detect the first file format. The server computing device 100 may detect the first file format in a manner similar or the same as that described above in relation to the execution of the file detection instructions 142, the file detection engine 240, the file detection engine 340, and/or other resource of the server computing device 100.

In an operation 420, first content and/or first metadata from the first detected file may be obtained. For example, the server computing device 100 (and/or the content retrieval instructions 143, the file detection engine 250, the file detection engine 350, or other resource of the server computing device 100) may obtain first content and/or first metadata from the first file. The server computing device 100 may obtain first content and/or first metadata from the first file in a manner similar or the same as that described above in relation to the execution of the content retrieval instructions 143, the file detection engine 250, the file detection engine 350, and/or other resource of the server computing device 100.

In an operation 430, the first metadata and/or the first content obtained from the first file may be stored in a directory table. For example, the server computing device 100 (and/or the table loading instructions 144, the table loading engine 260, table loading engine 360, and/or other resource of the server computing device 100) may store the first metadata and/or the first content. The server computing device 100 may store the first metadata and/or the first content in a manner similar or the same as that described above in relation to the execution of the table loading instructions 144, the table loading engine 260, table loading engine 360, and/or other resource of the server computing device 100.

In an operation 440, a second file format of a second file stored in the machine-readable storage medium 120 may be detected, where the second file format comprises a file format including structured data (e.g., a structured file format). For example, the server computing device 100 (and/or the file detection instructions 142, the file detection engine 240, the file detection engine 340, or other resource of the server computing device 100) may detect the second file format. The server computing device 100 may detect the second file format in a manner similar or the same as that described above in relation to the execution of the file detection instructions 142, the file detection engine 240, the file detection engine 340, and/or other resource of the server computing device 100.

In an operation 450, second content and/or second metadata from the second detected file may be obtained. For example, the server computing device 100 (and/or the content retrieval instructions 143, the file detection engine 250, the file detection engine 350, or other resource of the server computing device 100) may obtain second content and/or second metadata from the second file. The server computing device 100 may obtain second content and/or second metadata from the second file in a manner similar or the same as that described above in relation to the execution of the content retrieval instructions 143, the file detection engine 250, the file detection engine 350, and/or other resource of the server computing device 100.

In an operation 460, the second metadata and/or the second content obtained from the second file may be stored in the directory table. For example, the server computing device 100 (and/or the table loading instructions 144, the table loading engine 260, table loading engine 360, and/or other resource of the server computing device 100) may store the second metadata and/or the second content. The server computing device 100 may store the second metadata and/or the second content in a manner similar or the same as that described above in relation to the execution of the table loading instructions 144, the table loading engine 260, table loading engine 360, and/or other resource of the server computing device 100.

Figure 5:
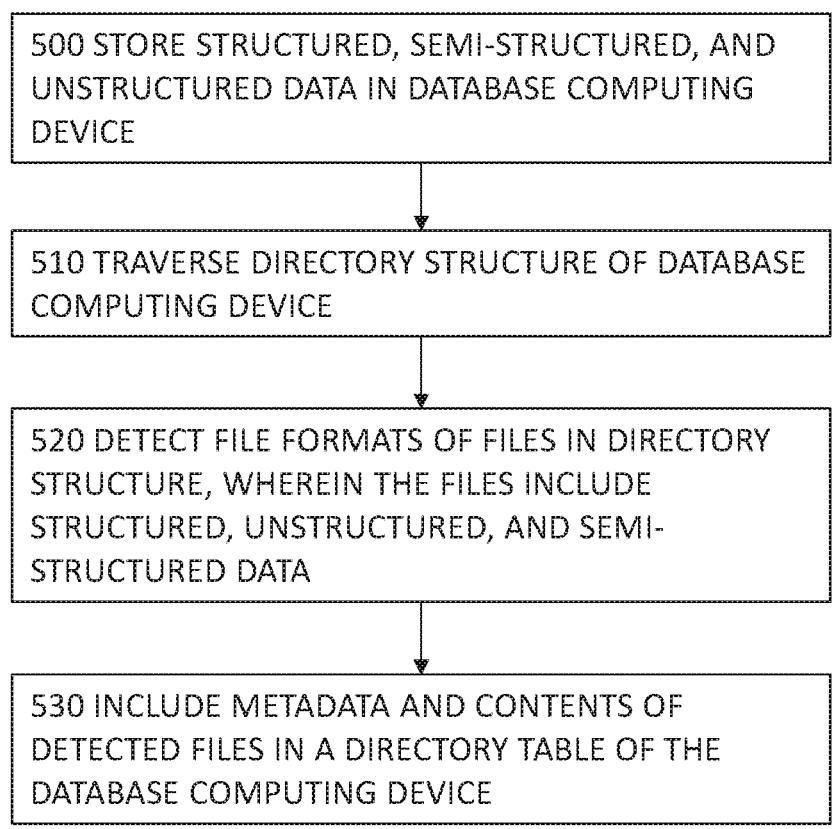
FIG. 5 is a flowchart of an example method for execution by a server computing device for embedded processing of structured and unstructured data.
Figure 5A:
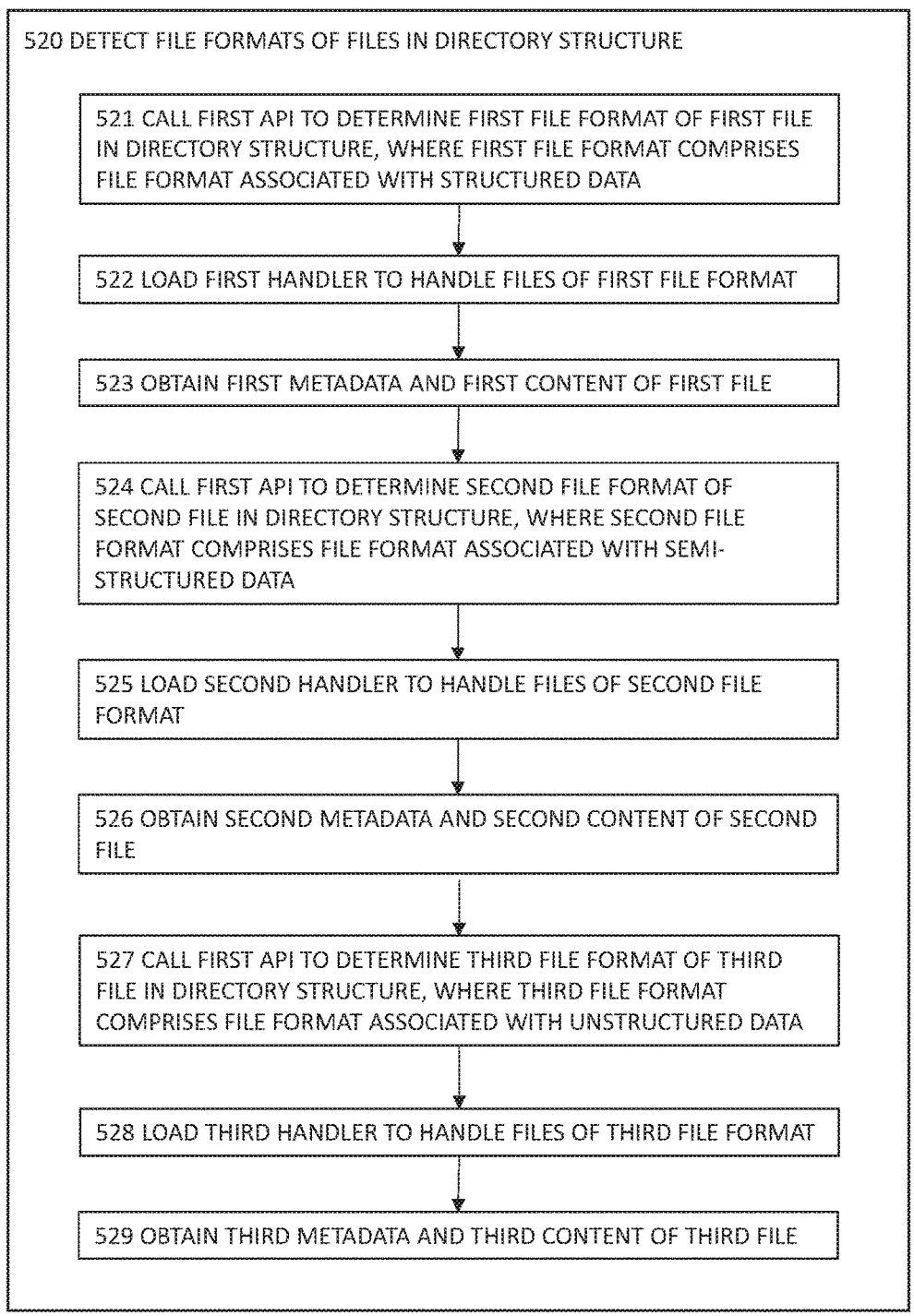
FIG. 5A is a flowchart of an example method for execution by a server computing device for detecting file formats of files in a directory structure.
Figure 5B:
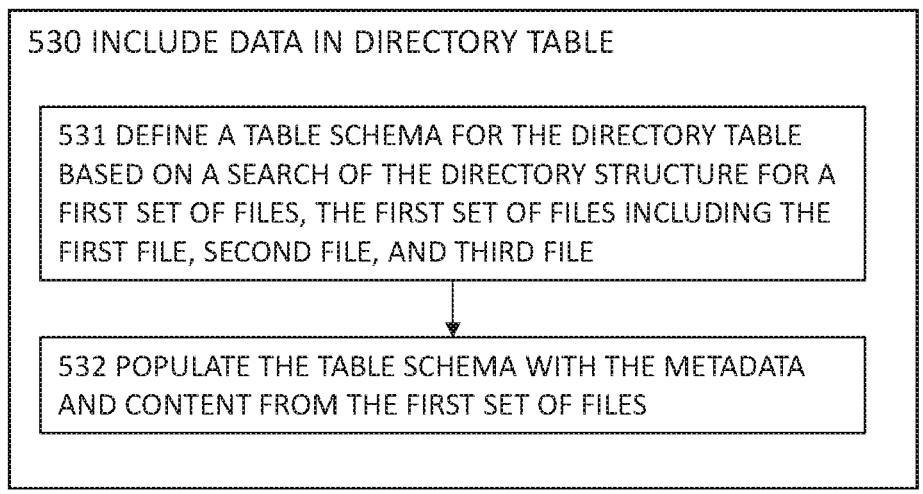
FIG. 5B is a flowchart of an example method for execution by a server computing device for including data in a directory table.
Figure 5C:
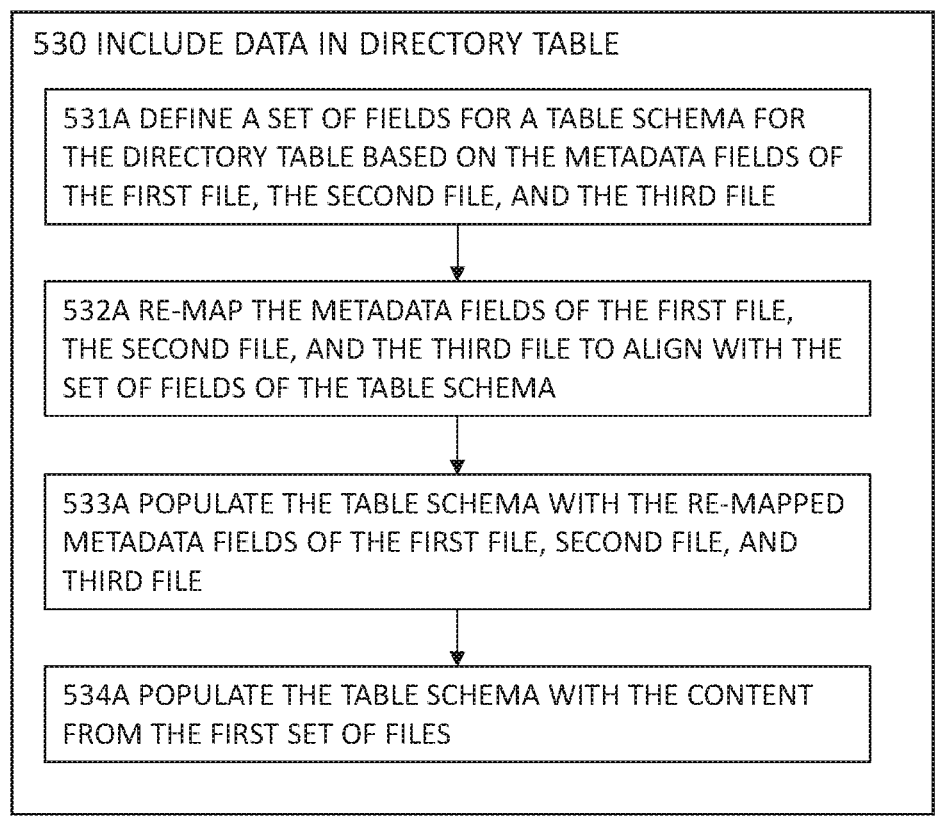
FIG. 5C is a flowchart of an example method for execution by a server computing device for including data in a directory table.

FIG. 5 is a flowchart of an example method for execution by a server computing device for embedded processing of structured and unstructured data. FIG. 5A is a flowchart of an example method for execution by a server computing device for detecting file formats of files in a directory structure. FIG. 5B is a flowchart of an example method for execution by a server computing device for including data in a directory table. FIG. 5C is a flowchart of another example method for execution by a server computing device for including data in a directory table.

Although execution of the method described below is with reference to server computing device 100, other suitable devices for execution of this method will be apparent to those of skill in the art, such as server computing device 200, server computing device 300, and/or other computing devices. The method described in FIG. 5 and other figures may be implemented in the form of executable instructions stored on a machine-readable storage medium, such as storage medium 120, and/or in the form of electronic circuitry.

In an operation 500, structured and unstructured data may be stored in the machine-readable storage medium 120. In some examples, semi-structured data may also be stored in the machine-readable storage medium 120. The data stored in the machine-readable storage medium 120 may be accessed from multiple sources. In some examples, the data may be accessed from both inside and outside an enterprise management system in which the server computing device 100 may reside. For example, the server computing device 100 (and/or the data loading engine 230, the data loading engine 330, or other resource of the server computing device) may store data in the machine-readable storage medium 120. The server computing device may store the structured and unstructured data in a manner similar or the same as that described above in relation to the execution of the data loading engine 230, the data loading engine 330, or other resource of the server computing device 100.

In an operation 510, the directory structure of the machine-readable storage medium 120 may be traversed. For example, the server computing device 100 (and/or the directory traversal instructions 141, the directory traversal engine 240, the directory traversal engine 340, or other resource of the server computing device 100) may traverse the directory. The server computing device 100 may traverse the directory in a manner similar or the same as that described above in relation to the execution of the directory traversal instructions 141, the directory traversal engine 240, the directory traversal engine 340, and/or other resource of the server computing device 100.

In an operation 520, the file formats of the filed in the directory structure may be detected, where the files may include structured data, unstructured data, semi-structured data, and/or other types of data. For example, the server computing device 100 (and/or the content retrieval instructions 142, the file detection engine 250, the file detection engine 350, or other resource of the server computing device 100) may detect the file formats. The server computing device 100 may detect the file formats in a manner similar or the same as that described above in relation to the execution of the content retrieval instructions 143, the file detection engine 250, the file detection engine 350, and/or other resource of the server computing device 100.

In some examples, the detection of the files traversed in the directory structure may comprise various operations.

For example, as depicted in FIG. 5A, in an operation 521, a first API may be called to determine a first file format of the first file in the directory structure, where the first file format comprises a file format associated with structured data. For example, the server computing device 100 (and/or the content retrieval instructions 143, the file detection engine 250, the file detection engine 350, or other resource of the server computing device 100) may call the first API to detect the first file format. The server computing device 100 may call the first API to detect the first file format in a manner similar or the same as that described above in relation to the execution of the file detection instructions 142, the content retrieval instructions 143, the file detection engine 250, the file detection engine 350, and/or other resource of the server computing device 100.

In an operation 522, a first handler may be loaded to handle files of the first file format. For example, the server computing device 100 (and/or the file detection instructions 142, the content retrieval instructions 143, the file detection engine 250, the file detection engine 350, or other resource of the server computing device 100) may load the first handler to handle files of the first file format. The server computing device 100 may load the first handler to handle files of the first file in a manner similar or the same as that described above in relation to the execution of file detection instructions 142, the content retrieval instructions 143, the file detection engine 250, the file detection engine 350, and/or other resource of the server computing device 100.

In an operation 523, first metadata and/or first content of the first file may be obtained. For example, the server computing device 100 (and/or the file detection instructions 142, the content retrieval instructions 143, the file detection engine 250, the file detection engine 350, or other resource of the server computing device 100) may obtain the metadata and/or content of the first file. The server computing device 100 may m obtain the metadata and/or content of the first file in a manner similar or the same as that described above in relation to the execution of file detection instructions 142, the content retrieval instructions 143, the file detection engine 250, the file detection engine 350, and/or other resource of the server computing device 100.

In an operation 524, the first API may be called to determine a second file format of the second file in the directory structure, where the second file format comprises a file format associated with semi-structured data. For example, the server computing device 100 (and/or the content retrieval instructions 143, the file detection engine 250, the file detection engine 350, or other resource of the server computing device 100) may call the first API to detect the second file format. The server computing device 100 may call the first API to detect the second file format in a manner similar or the same as that described above in relation to the execution of the file detection instructions 142, the content retrieval instructions 143, the file detection engine 250, the file detection engine 350, and/or other resource of the server computing device 100.

In an operation 525, a second handler may be loaded to handle files of the second file format. For example, the server computing device 100 (and/or the file detection instructions 142, the content retrieval instructions 143, the file detection engine 250, the file detection engine 350, or other resource of the server computing device 100) may load the second handler to handle files of the second file format. The server computing device 100 may load the second handler to handle files of the second file in a manner similar or the same as that described above in relation to the execution of file detection instructions 142, the content retrieval instructions 143, the file detection engine 250, the file detection engine 350, and/or other resource of the server computing device 100.

In an operation 526, second metadata and/or second content of the second file may be obtained. For example, the server computing device 100 (and/or the file detection instructions 142, the content retrieval instructions 143, the file detection engine 250, the file detection engine 350, or other resource of the server computing device 100) may obtain the metadata and/or content of the second file. The server computing device 100 may m obtain the metadata and/or content of the second file in a manner similar or the same as that described above in relation to the execution of file detection instructions 142, the content retrieval instructions 143, the file detection engine 250, the file detection engine 350, and/or other resource of the server computing device 100.

In an operation 527, the first API may be called to determine a third file format of the third file in the directory structure, where the third file format comprises a file format associated with unstructured data. For example, the server computing device 100 (and/or the content retrieval instructions 143, the file detection engine 250, the file detection engine 350, or other resource of the server computing device 100) may call the first API to detect the third file format. The server computing device 100 may call the first API to detect the third file format in a manner similar or the same as that described above in relation to the execution of the file detection instructions 142, the content retrieval instructions 143, the file detection engine 250, the file detection engine 350, and/or other resource of the server computing device 100.

In an operation 528, a third handler may be loaded to handle files of the third file format. For example, the server computing device 100 (and/or the file detection instructions 142, the content retrieval instructions 143, the file detection engine 250, the file detection engine 350, or other resource of the server computing device 100) may load the third handler to handle files of the third file format. The server computing device 100 may load the third handler to handle files of the third file in a manner similar or the same as that described above in relation to the execution of file detection instructions 142, the content retrieval instructions 143, the file detection engine 250, the file detection engine 350, and/or other resource of the server computing device 100.

In an operation 529, third metadata and/or third content of the third file may be obtained. For example, the server computing device 100 (and/or the file detection instructions 142, the content retrieval instructions 143, the file detection engine 250, the file detection engine 350, or other resource of the server computing device 100) may obtain the metadata and/or content of the third file. The server computing device 100 may m obtain the metadata and/or content of the third file in a manner similar or the same as that described above in relation to the execution of file detection instructions 142, the content retrieval instructions 143, the file detection engine 250, the file detection engine 350, and/or other resource of the server computing device 100.

Returning to FIG. 5, in an operation 530, the metadata and/or the content of the detected files may be stored in a directory table. For example, the server computing device 100 (and/or the table loading instructions 144, the table loading engine 260, the table loading engine 360, or other resource of the server computing device 100) may maintain the list of APIs. The server computing device 100 may maintain the list of APIs in a manner similar or the same as that described above in relation to the execution of table loading instructions 144, the table loading engine 260, the table loading engine 360, and/or other resource of the server computing device 100.

In some examples, the loading of the metadata and/or content of the set of files in the directory table may comprise various operations. FIGS. 5B and 5C depict example methods by which data is included in the directory table.

As depicted in FIG. 5B, in an operation 531, a set of fields for a table schema for the directory table may be defined based on the metadata fields of the first file, the second file, the third file, and/or other files in the set of files. For example, the server computing device 100 (and/or the table loading instructions 144, the table loading engine 260, the table loading engine 360, or other resource of the server computing device 100) may define the set of fields for the table schema. The server computing device 100 may define the set of fields for the table schema in a manner similar or the same as that described above in relation to the execution of table loading instructions 144, the table loading engine 260, the table loading engine 360, and/or other resource of the server computing device 100.

In an operation 532, the table schema may be populated with the metadata and content from the first set of files. For example, the server computing device 100 (and/or the table loading instructions 144, the table loading engine 260, the table loading engine 360, or other resource of the server computing device 100) may populate the table schema. The server computing device 100 may populate the table schema in a manner similar or the same as that described above in relation to the execution of table loading instructions 144, the table loading engine 260, the table loading engine 360, and/or other resource of the server computing device 100.

As depicted in FIG. 5C, in an operation 531A, a set of fields for a table schema for the directory table may be defined based on the metadata fields of the first file, the second file, the third file, and/or other files in the set of files. For example, the server computing device 100 (and/or the table loading instructions 144, the table loading engine 260, the table loading engine 360, or other resource of the server computing device 100) may define the set of fields for the table schema. The server computing device 100 may define the set of fields for the table schema in a manner similar or the same as that described above in relation to the execution of table loading instructions 144, the table loading engine 260, the table loading engine 360, and/or other resource of the server computing device 100.

In an operation 532A, the metadata fields of the first file, the second file, the third file, and/or other files in the set of files may be re-mapped to align with the set of fields in the table schema. For example, the server computing device 100 (and/or the table loading instructions 144, the table loading engine 260, the table loading engine 360, or other resource of the server computing device 100) may re-map the metadata fields of the set of files. The server computing device 100 may re-map the metadata fields of the set of files APIs in a manner similar or the same as that described above in relation to the execution of table loading instructions 144, the table loading engine 260, the table loading engine 360, and/or other resource of the server computing device 100.

In an operation 533A, may populate the table schema with the re-mapped metadata fields of the first file, the second file, the third file, and/or other files in the set of files. For example, the server computing device 100 (and/or the table loading instructions 144, the table loading engine 260, the table loading engine 360, or other resource of the server computing device 100) may populate the table schema with the re-mapped metadata fields. The server computing device 100 may populate the table schema with the re-mapped metadata fields in a manner similar or the same as that described above in relation to the execution of table loading instructions 144, the table loading engine 260, the table loading engine 360, and/or other resource of the server computing device 100.

In an operation 534A, the table schema may be populated with the content from the first set of files. For example, the server computing device 100 (and/or the table loading instructions 144, the table loading engine 260, the table loading engine 360, or other resource of the server computing device 100) may populate the table schema with the content of the first set of files. The server computing device 100 may populate the table schema with the content of the first set of files in a manner similar or the same as that described above in relation to the execution of table loading instructions 144, the table loading engine 260, the table loading engine 360, and/or other resource of the server computing device 100.

The foregoing disclosure describes a number of example embodiments for embedded processing of structured and unstructured data. The disclosed examples may include systems, devices, computer-readable storage media, and methods for embedded processing of structured, unstructured, and/or semi-structured data. For purposes of explanation, certain examples are described with reference to the components illustrated in FIGS. 1-5C. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-5C are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions executable by a processor of a computing device to:

store structured and unstructured data, in formats as received from different sources, in a directory structure of the computing device without accessing content or metadata of the structured and unstructured data and without translating or changing the formats of the structured and unstructured data prior to storing the structured and unstructured data in the directory structure; and after the structured and unstructured data is stored in the directory structure, traverse each file of the structured and unstructured data in the directory structure of the computing device to organize and store each file in a directory table of the computing device, including:

for a first file traversed in the directory structure, detect a first file format of the first file, the first file format comprising an unstructured file type, obtain first content and first metadata of the first file, translate the first content of the first file from the first file format into a format used by a database of the computing device, store the translated first content in the database, and store the first metadata of the first file in the directory table, and for a second file traversed in the directory structure, detect a second file format of the second file, the second file format comprising a structured file type, obtain second content and second metadata of the second file, translate the second content of the second file from the second file format into the format used by the database, store the translated second content in the database, and store the second metadata of the second file in the directory table.

2. The storage medium of claim 1, wherein the instructions executable by the processor of the computing device to detect the first file format of the first file comprise instructions to: call a first application protocol interface (API) to determine the first file format and obtain the first content and the first metadata of the first file, and
wherein the instructions executable by the processor of the computing device to detect the second file format of the second file comprise instructions to: call the first API to determine the second file format and obtain the second content and the second metadata of the second file.

3. The storage medium of claim 2, wherein the instructions executable by the processor of the computing device to traverse the directory structure comprises instructions to:
issue a search of the directory structure for a first set of files, the first set of files comprising the first file and the second file; and
define a table schema for the directory table based on the search, wherein the defined table schema comprises a set of fields that correspond to a first set of fields of the first metadata and a second set of fields of the second metadata.

4. The storage medium of claim 3, further comprising instructions executable by the processor of the computing device to:
populate the first metadata of the first file in the directory table.

5. The storage medium of claim 1, wherein the instructions executable by the processor of the computing device to include the first metadata of the first file in the directory table comprises instructions to:
determine a set of fields for the directory table based on a first set of metadata fields of the first metadata and a second set of metadata fields of the second metadata; and
define a table schema for the directory table based on the determined set of fields.

6. The storage medium of claim 5, wherein the instructions executable by the processor of the computing device to include the first metadata of the first file in the directory table comprises instructions to:
re-map the first set of metadata fields to a subset of the determined set of fields.

7. A method for execution by a computing device for embedded processing of structured and unstructured data, the method comprising:
storing, in a non-transitory machine-readable storage medium of the computing device, the structured and non-structured data in formats as received from different sources without accessing content or metadata of the structured and unstructured data and without translating or changing the formats of the structured and unstructured data prior to storing the structured and unstructured data in the storage medium;
after the structured and unstructured data is stored in the storage medium, traversing each file of the structured and unstructured data in the storage medium to organize and store each file in a directory table in the storage medium, including:
for a first file in a directory structure of the storage medium, detecting a first file format of the first file, the first file format comprising an unstructured file type;
obtaining first content and first metadata of the first file;
storing the first metadata of the first file in the directory table and the first content of the first file in a database of the storage medium;
for a second file in the directory structure, detecting a second file format of the second file, the second file format comprising a structured file type;
obtaining second content and second metadata of the second file; and
storing the second metadata of the second file in the directory table and the second content of the second file in the database, wherein, prior to storing the first content of the first file in the database, translating the first content of the first file from the first file format to a format used by the database, and prior to storing the second content of the second file in the database, translating the second content of the second file from the second file format to a format used by the database.

8. The method of claim 7, wherein detecting the first file format of the first file comprises: calling a first application protocol interface (API) to determine the first file format and obtain the first content and the first metadata of the first file, and
wherein detecting the second file format of the second file comprises: calling the first API to determine the second file format and obtain the second content and the second metadata of the second file.

9. The method of claim 7, further comprising:
performing a search of the directory structure for a first set of files, the first set of files comprising the first file and the second file; and
defining a table schema for the directory table based on the search, wherein the defined table schema comprises a set of fields that correspond to a first set of fields of the first metadata and a second set of fields of the second metadata.

10. The method of claim 9, further comprising:
for a third file traversed in the directory structure of the storage medium, detecting a third file format of the third file, the third file format comprising a semi-structured file type;
obtaining third content and third metadata of the third file; and
storing the third metadata of the third file in the directory table and the third content of the third file in the database.

11. The method of claim 7, further comprising:
determining a set of fields for the directory table based on a first set of metadata fields of the first metadata and a second set of metadata fields of the second metadata;
defining a table schema for the directory table based on the determined set of fields; and
re-mapping the first set of metadata fields to a subset of the determined set of fields.

12. A server computing device comprising: a processor and a memory storing instructions that when executed cause the processor to:
store structured data and unstructured data, in formats as received from a set of source computing devices into a non-transitory machine-readable storage medium of the server computing device without accessing content or metadata of the structured and unstructured data and without translating or changing the formats of the structured and unstructured data prior to storing the structured and unstructured in the storage medium;

update a directory structure of the server computing device to include the structured data and unstructured data; and after the structured data and unstructured data is stored in the directory structure, traverse each file of the structured and unstructured data in the directory structure to organize and store each file into a directory table of the storage medium, including:

for a first file traversed in the directory structure, detect a first file format of the first file, the first file comprising first unstructured data;

obtain first content and first metadata of the first file;

translate the first content of the first file from the first file format to the format used by a database;

for a second file traversed in the directory structure, detect a second file format of the second file, the second file comprising second semi-structured data;

obtain second content and second metadata of the second file;

translate the second content of the second file from the second file format to the format used by the database;

store the first metadata of the first file and the second metadata of the second file in the directory table; and store the translated first content of the first file and the translated second content of the second file in the database.

13. The server computing device of claim 12, wherein the instructions are to cause the processor to:

detect a third file format of a third file traversed in the directory structure, the third file comprising third structured data;

obtain third content and third metadata of the third file;

translate the third content from the third file format to the format used by the database;

store the translated third content in the database; and store the third metadata of the third file in the directory table.

14. The server computing device of claim 13, wherein the instructions are to detect the first file format of the first file, the second file format of the second file, and the third file format of the third file by:

calling a first application protocol interface (API) to determine the first file format and obtain the first content and the first metadata of the first file, calling the first API to determine the second file format and obtain the second content and the second metadata of the second file, and calling the first API to determine the third file format and obtain the third content and the third metadata of the third file.

* * * * *